United States Patent [19]

Derr et al.

[11] Patent Number: 4,891,766
[45] Date of Patent: Jan. 2, 1990

[54] EDITOR FOR EXPERT SYSTEM

[75] Inventors: Andrew G. Derr; Charles A. McLaughlin, both of Endicott, N.Y.

[73] Assignee: International Business Machines Corporation, Armonk, N.Y.

[21] Appl. No.: 368,071

[22] Filed: Jun. 15, 1989

Related U.S. Application Data

[63] Continuation of Ser. No. 61,832, Jun. 15, 1987, abandoned.

[51] Int. Cl.⁴ ............................................. G06F 15/20
[52] U.S. Cl. .................................. 364/513; 364/200; 364/274.5; 364/300; 364/900; 364/972.3
[58] Field of Search ........ 364/513, 300, 200 MS File, 364/900 MS File; 382/14, 15, 36–40

[56] References Cited

U.S. PATENT DOCUMENTS

| | | | |
|---|---|---|---|
| 4,591,983 | 5/1986 | Bennett et al. | 364/478 X |
| 4,620,286 | 10/1986 | Smith et al. | 364/513 |
| 4,648,044 | 3/1987 | Hardy et al. | 364/900 X |
| 4,656,603 | 4/1987 | Dunn | 364/513 X |
| 4,658,370 | 4/1987 | Erman et al. | 364/300 X |
| 4,670,848 | 6/1987 | Schramm | 364/900 X |

OTHER PUBLICATIONS

Hayes-Roth et al.-*Building Expert Systems;* Addison-Wesley, 1984; pp. 149–153, 283, 290–321.

*Primary Examiner*—Joseph Ruggiero

[57] ABSTRACT

The present invention provides a contextual editor for an expert system. The editor leads the operator through a series of screens which designate classes of information, logical nodes, and the interrelation of the nodes. The screens are so arranged that they prevent the operator from providing classes or nodes with logically insufficient information. At the end of each definition the screen automatically shows a logical tree which graphically illustrates the logical interconnection between the nodes.

The editor provided by the present invention provides the knowledge base developer with a guided knowledge entry system that modifies its behavior based on the context of the knowledge structures being entered. This approach not only facilitates the creation of the rules base knowledge, but also frequently prevents the user from entering invalid values or logic structures. Also, the guided editing approach allows the developer to learn and use the system much more quickly, thus becoming productive much sooner.

4 Claims, 11 Drawing Sheets

MAIN SELECTION SCREEN

RULE TREE AND CLASS LIST EDITOR

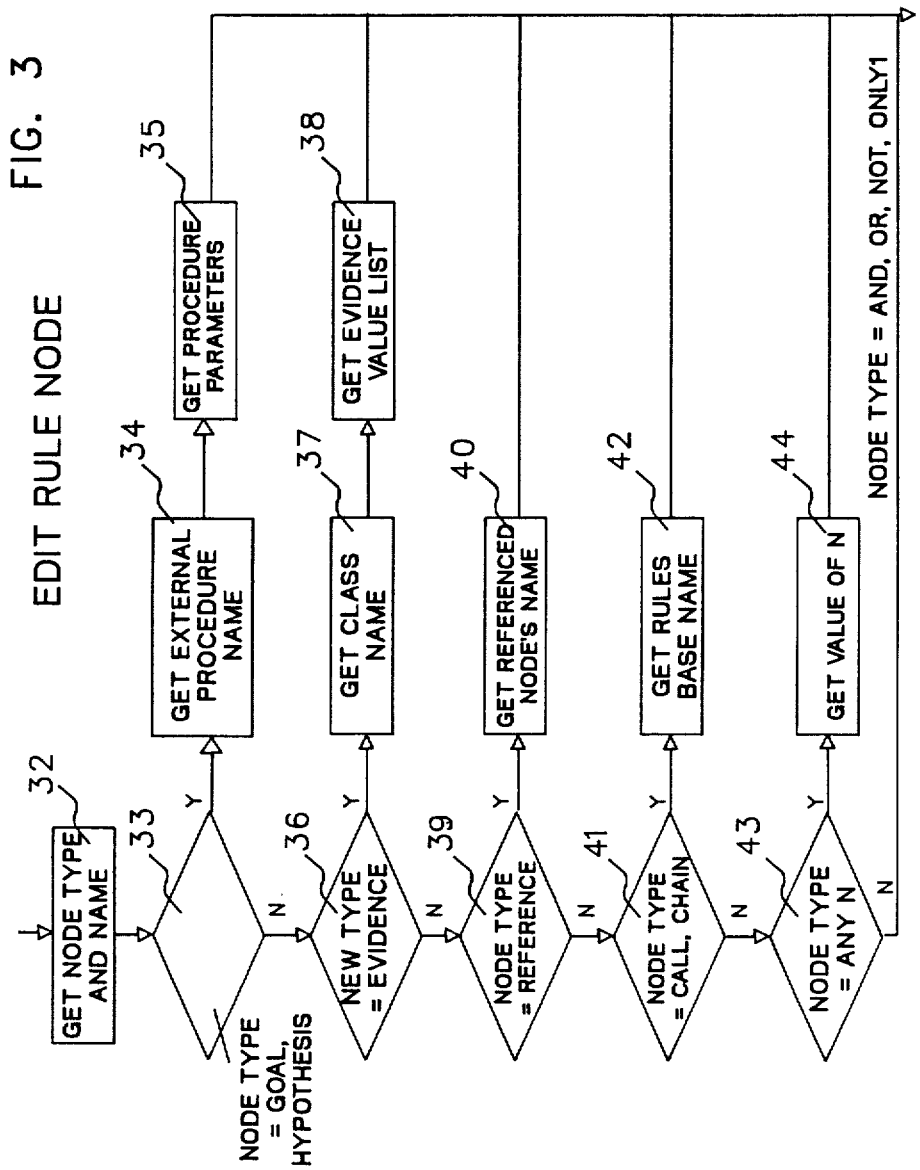

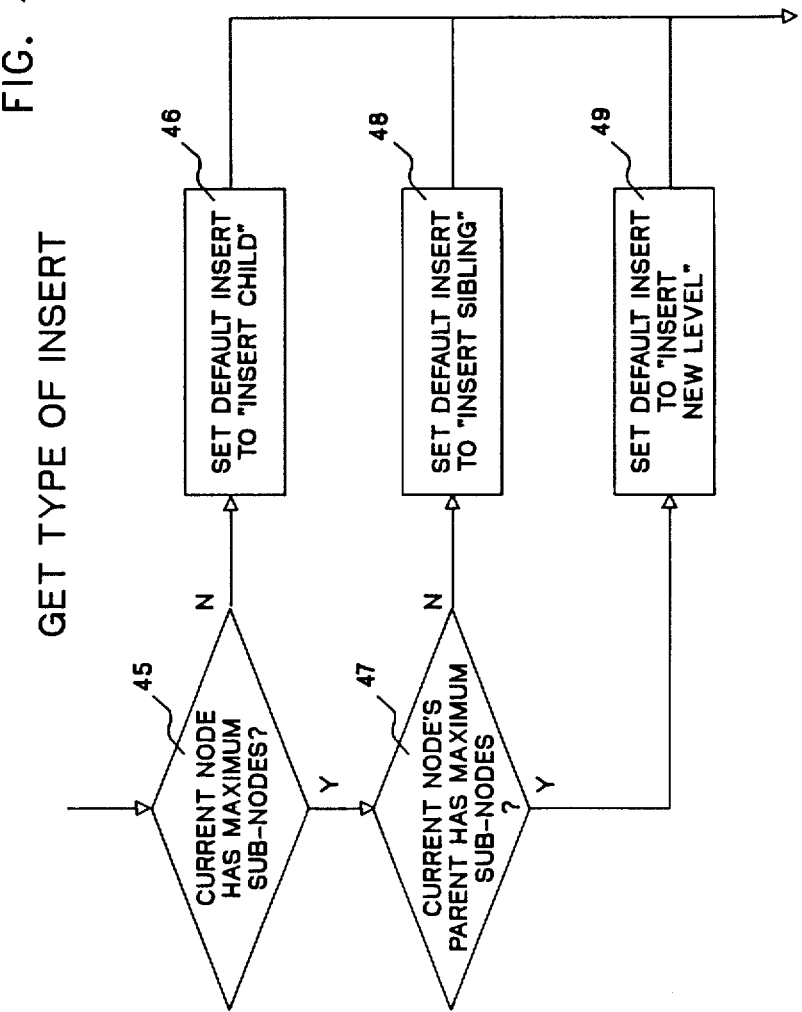

EDITOR FOR EXPERT SYSTEM

TECHNICAL FIELD

The present invention relates to expert systems and more particularly to an editing method and system for creating expert systems.

BACKGROUND AND PRIOR ART

Computer programs in the area of artificial intelligence and expert systems are well known. A book entitled *The Fifth Generation* by Edward Feigenbaum and Pamela McCorduc, Addison-Wesley 1983, and a book entitled *Building Expert Systems* by Frederick Hayes-Roth, Donald Waterman and Douglas Lenat, Addison-Wesley, 1984, give a good introduction to the state of the art in this area.

U.S. Pat. No. 4,648,044 (Hardy), U.S. Pat. No. 4,595,982 (Burt), and U.S. Pat. No. 4,644,479 (Bellows) are representative of recently issued patents in the area of expert systems.

There are a large number of commercially available programs in this area. Some of these programs are designed to run on large mainframe computers. Others are designed to run on relatively small personal computers. Computer programs which facilitate the development of expert systems are generally termed Expert System Shells. A program commercially available from the International Business Machines Corporation as program Number 5798-RWQ entitled "Expert Systems Development Environment" is an example of a Expert System Shell that is designed to run on large computers. A program entitled "GURU" marketed by Micro Data Base Systems Inc. is an example of an Expert Systems Shell that is designed to run on relatively small personal computers. A variety of such programs are commercially available.

Many of the commercially available Expert System Shells have editors which facilitate entering the data and rules necessary to create an expert system. The available editors generally fall into two broad categories.

First there are some Expert System Shells which use text editors to enter parameters data and rules. Many text editors are commercially available. For example, an editor called the "Personal Editor" is commercially available from IBM for use on Personal Computers. Many other text editors are also commercially available. A text editor is what is used to enter information into the previously referenced expert shell called "GURU".

The second type of editor generally used is represented by the editor in the previously referenced program called the "Expert System Development Environment". The editor used in this program has a series of panels which provide selections. However, the panels provided by the "Expert System Development Environment" program do not automatically lead the operator through a series of panels that request information required to define classes and nodes as does the present invention. The panels presented by editors such as the "Expert System Development Environment" provide the operator with a list of choices and the operator must choose the sequence of steps he wants to use in the definition process. With the present invention, the sequence necessary to define each particular class and node is automatically presented to the operator, thereby making the present invention exceptionally easy to learn and use.

OBJECTS OF THE INVENTION

An object of the present invention is to provide an editor which facilitates the generation of expert systems.

Another object of the present invention is to provide an improved editor for use in an expert system shell.

Another object of the present invention is to provide an editor for an expert system shell which is very easy to use.

Still another object of the present invention is to provide an editor for use in an expert system shell which leads the operator through the steps necessary to create an expert system.

Yet another object of the present invention is to provide an editor which prompts the operator as to what information is needed to continue with the generation of an expert system.

Another object of the present invention is to provide a method of editing information and data to facilitate the creation of expert systems.

Another object of the present invention is to provide a system which facilitates editing data and information to facilitate the creation of expert systems.

The foregoing and other objects, features and advantages of the invention will be apparent from the more particular description of the preferred embodiments of the invention, as illustrated in the accompanying drawing.

SUMMARY OF THE INVENTION

The present invention provides a contextual editor for an expert system. The editor leads the operator through a series of screens which designate classes of information, logical nodes, and the interrelation of the nodes. The screens are so arranged that they prevent the operator from providing classes or nodes with logically insufficient information. At the end of each definition the screen automatically shows a logical tree which graphically illustrates the logical interconnection between the nodes.

The editor provided by the present invention provides the knowledge base developer with a guided knowledge entry system that modifies its behavior based on the context of the knowledge structures being entered. This approach not only facilitates the creation of the rules base knowledge, but also frequently prevents the user from entering invalid values or logic structures. Also, the guided editing approach allows the developer to learn and use the system much more quickly, thus becoming productive much sooner.

DESCRIPTION OF THE DRAWINGS

FIG. 3 is a block diagram expansion of the "Edit Rule Node" block.

FIG. 4. is a block diagram expansion of the "Get Type of Insert" block.

DETAILED DESCRIPTION

The embodiment of the invention described herein will be described by first describing a typical editing session and then explaining a flow diagram of the computer program that implements an editor in accordance with the present invention.

In the example given herein the following terms will have the following meanings:

Rules Base: This is used as a synonym for a conventional knowledge base.

Class: represents a specific piece of input data to the system.

Class Scope: This indicates to which data this class applies. It can have three values: GLOBAL, LOCAL or EXTERNAL. These terms have the conventional programming meaning.

Class Procedure: The program that is run to obtain the input value to the class.

Parameters: This has the conventional programming meaning.

Class value list: List of valid input to the class.

Nodes: Nodes can only have values of true or false. There are a plurality of types of nodes. As shown herein there are five types of nodes, namely, GOAL, EVIDENCE, AND, OR, and NOT.

Goal: The final action or conclusion that is the culmination of a set of logical relationships:

Evidence: The input data which will be examined.

AND, OR and NOT: Conventional logical connectives.

Rule Tree: The way that the rule nodes are interrelated.

Type Of Node Insertion: This has three choices, namely, CHILD, SIBLING or NEW LEVEL. These define how the node being inserted relates to the existing nodes.

The meaning of the terms used is best understood by considering a simple example. Consider as a simple example a system which gathers information about an automobile to determine if the automobile is out of gas. (It should be clearly understood that this is a very trivial example for the purposes of illustration only.) The example has two "classes" of information. The classes are:

(1) "Is the car stalled" and
(2) "Is the gas gauge pointing to empty". The "goal" in this example is "Add gas to the car". The "evidence nodes" have values of "true" or "false" with reference to (1) and (2) above. The "AND node" connects (1) and (2) above and the goal.

Figure 1A:
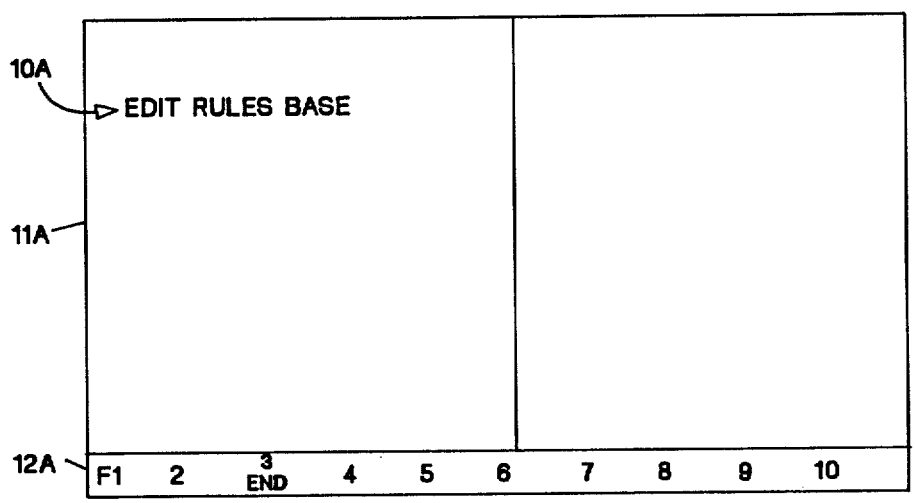
FIGS. 1A to 1P illustrate an example of the type of series of screens that would be presented to an operator.
Figure 1B:
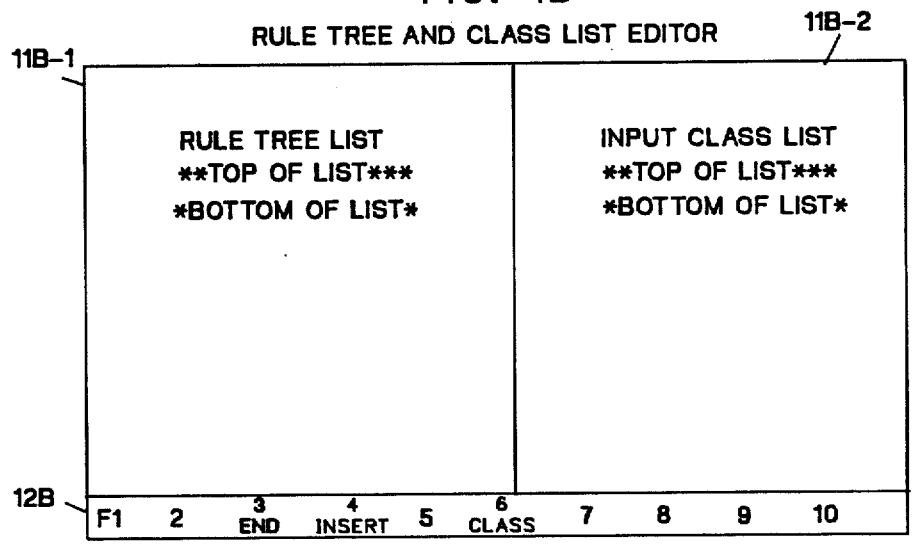
Figure 1C:
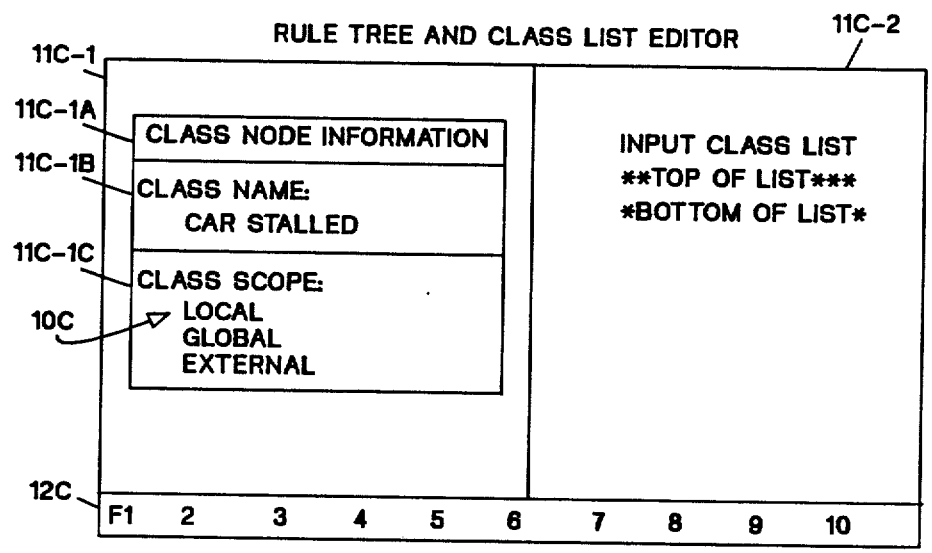
Figure 1D:
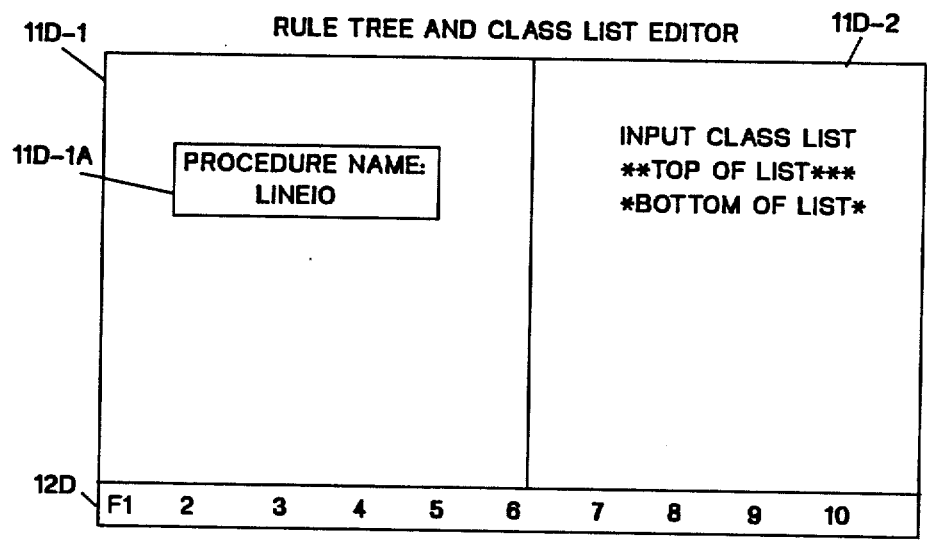
Figure 1E:
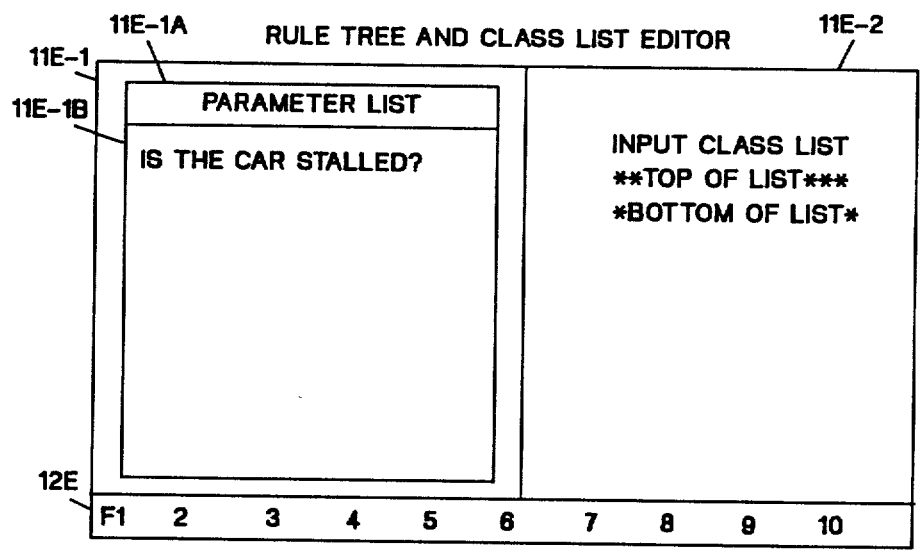
Figure 1F:
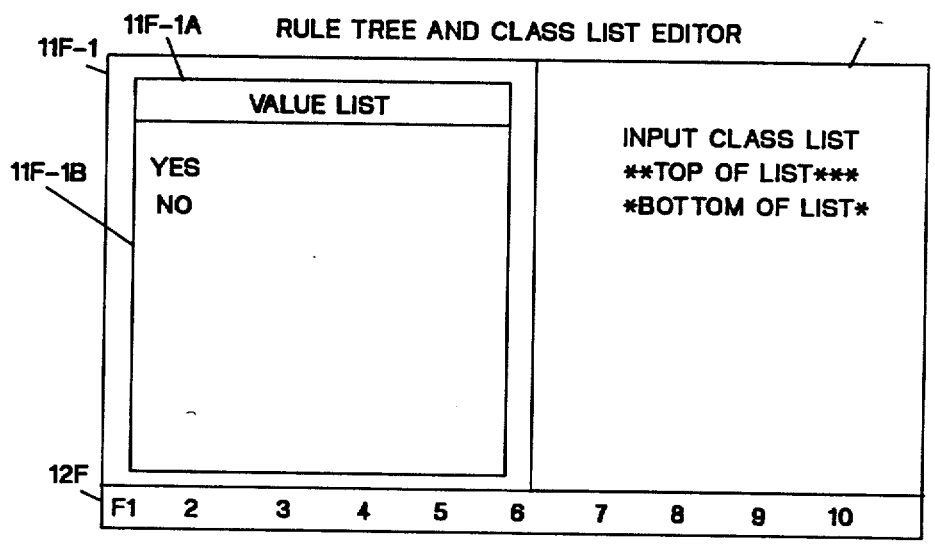
Figure 1G:
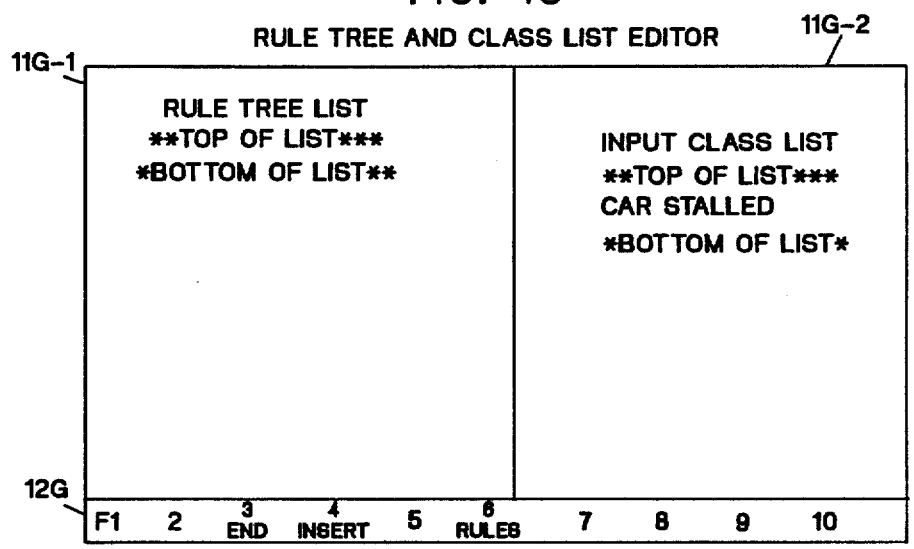
Figure 1H:
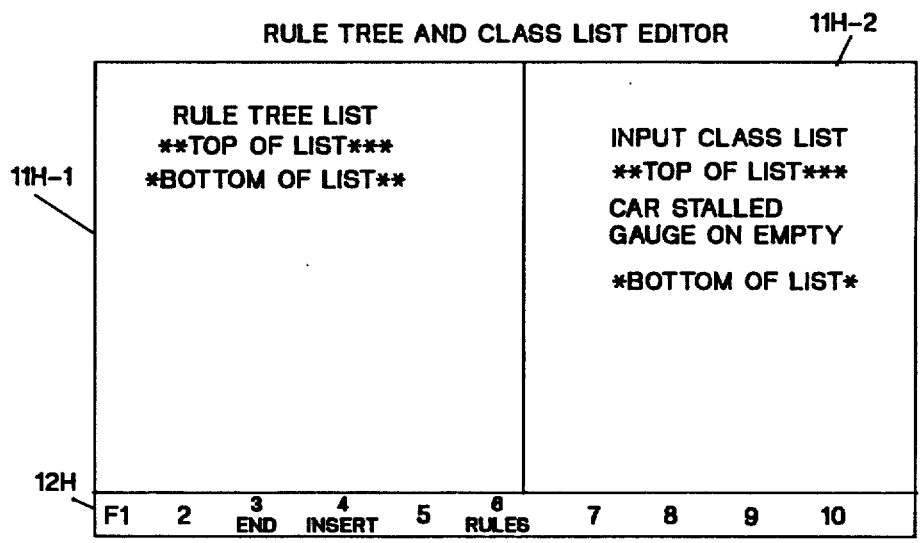
Figure 1I:
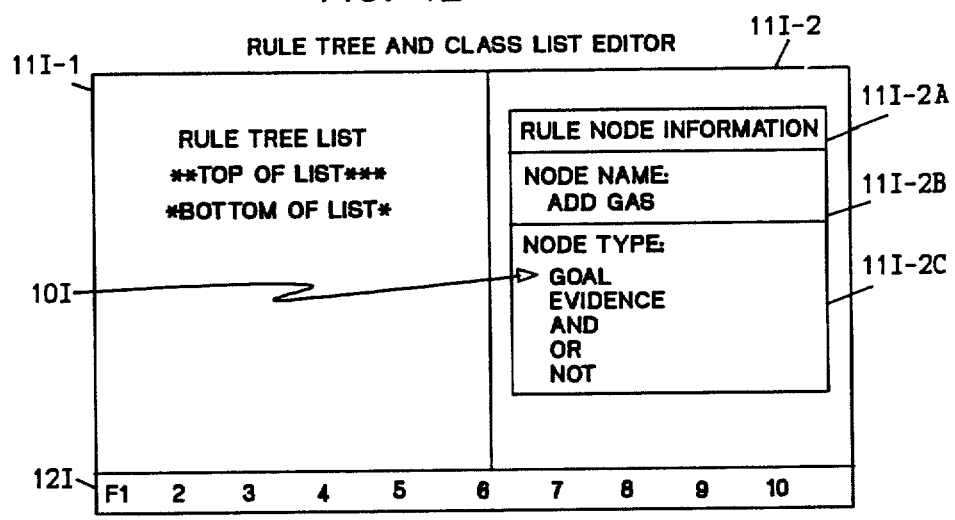
Figure 1J:
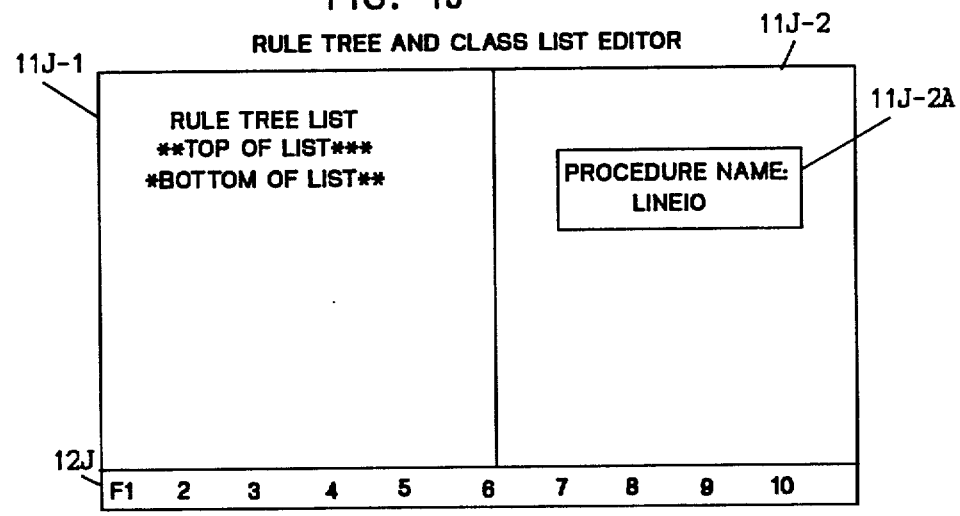
Figure 1K:
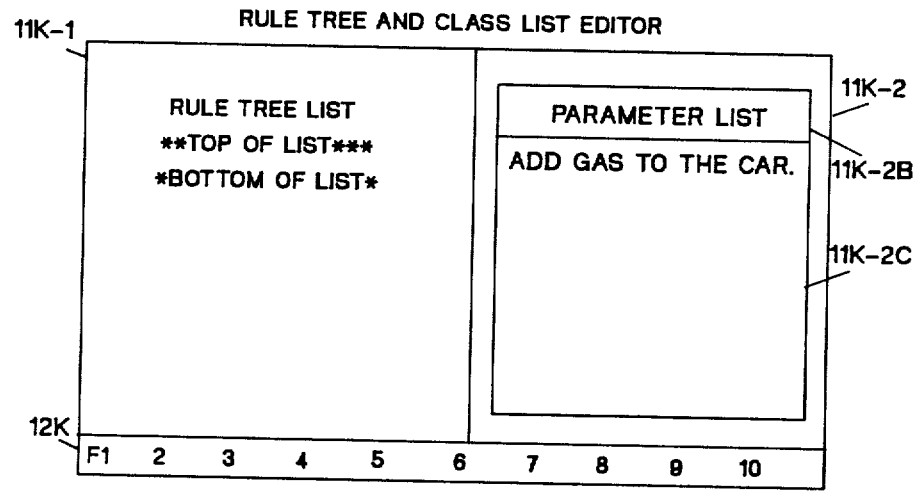
Figure 1L:
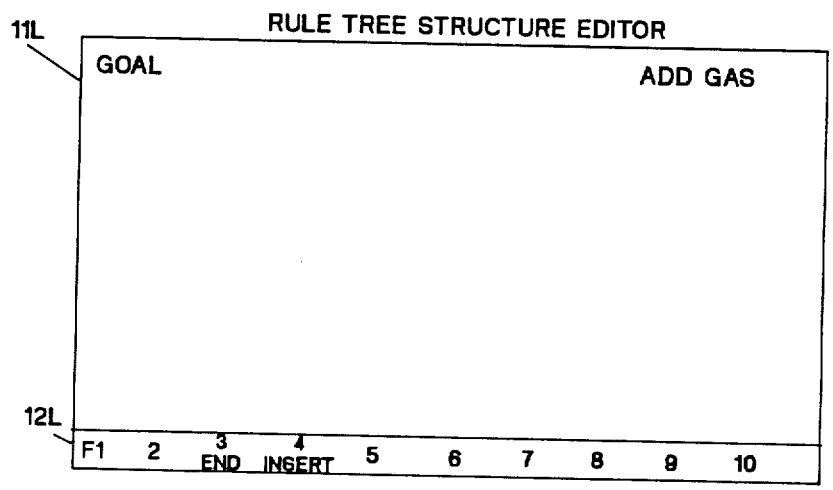
Figure 1M:
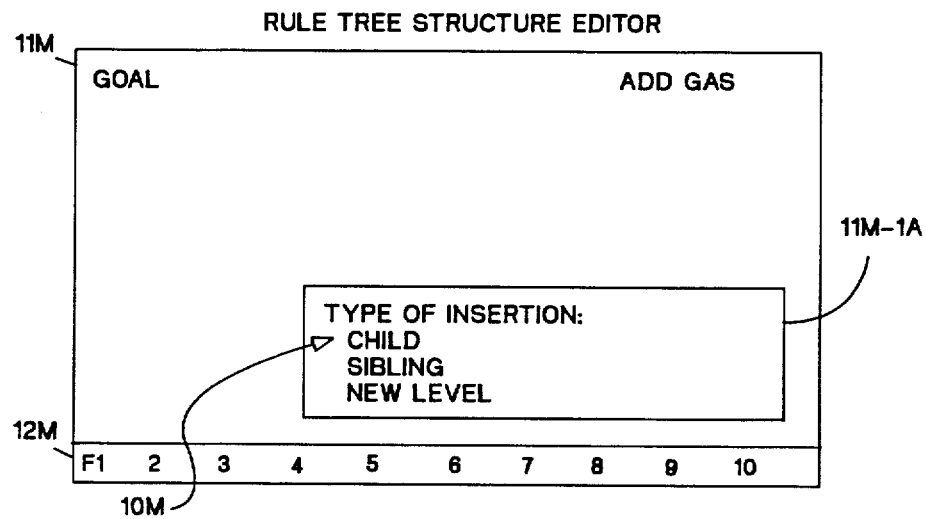
Figure 1N:
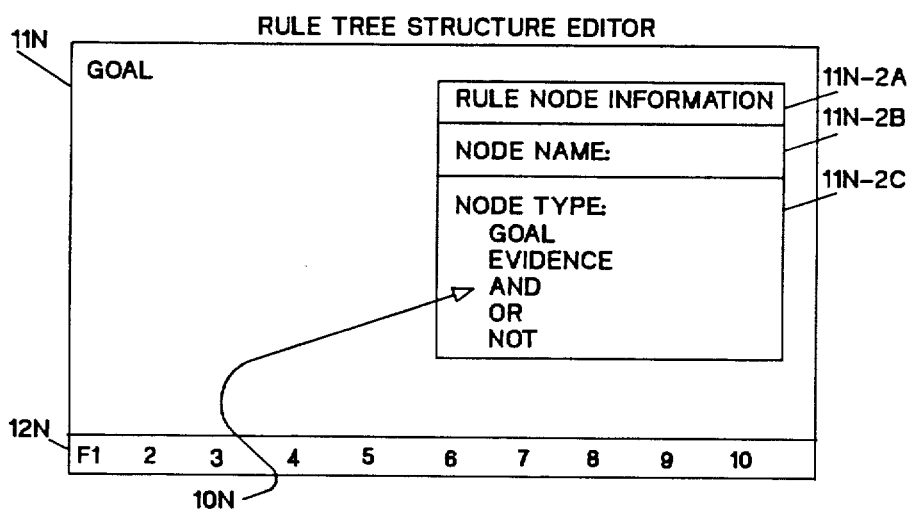
Figure 1O:
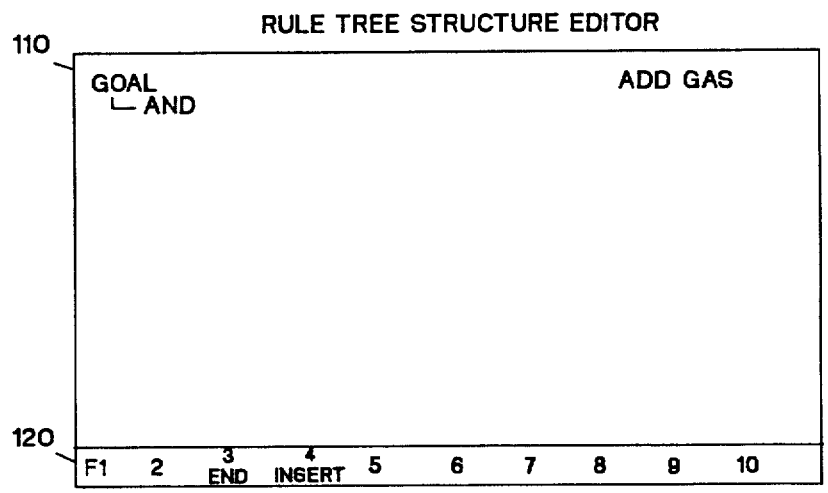
Figure 1P:
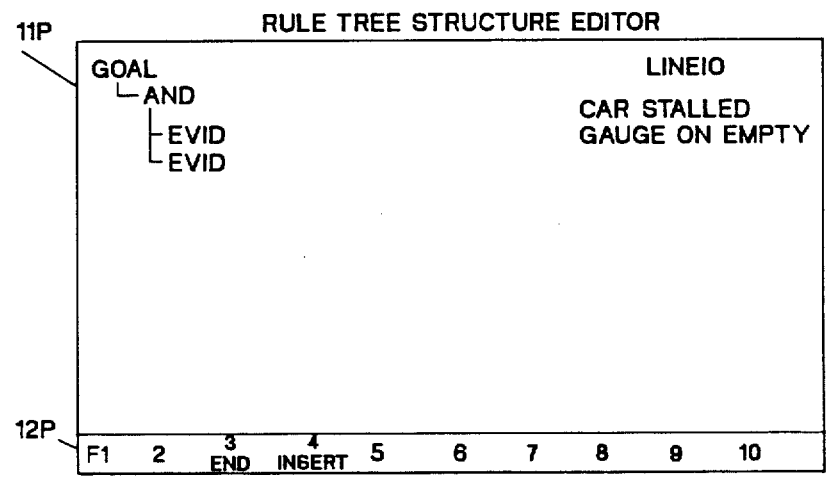

An example of a typical editing session is demonstrated in FIGS. 1A through 1P. This example shows how the editor of the present invention can be used to build a knowledge base for the simple example given above.

In FIG. 1A, the main selection screen 11A is displayed. This is the first screen that the user will see upon entry to the system. The conventional cursor is represented as mark designated 10A. To enter the editor, the user selects the "Edit Rules Base" line with the cursor and presses ENTER. The conventional "function" keys are shown in block 12A. In this panel the only function key which has an assigned value is function key F3 which is used to "QUIT" the editing session. The screen shown only has one selection line, namely, "Edit Rules Base". Naturally, other lines could be present; however, the other lines are not relevant to this invention, hence, they are not shown.

The main "editor screen" is illustrated in FIG. 1B. This screen has two sections which are designated 11B-1 and 11B-2. Section 11B-1, shows a list of classes (input data), Section 11B-2, shows the rule trees (knowledge structures). Since in this example there are no classes or rule trees defined as yet, the sections 11B-1 and 11B-2 do not show any classes or rule trees. The user can toggle between these lists by pressing F6 as shown in block 12B. It should be noted that the definition of F6 changes based upon which list is currently in active use.

FIG. 1C illustrates what happens when a user chooses to insert a new class by pressing the F4 or INSERT key when viewing the panel shown in FIG. 1B. The user is automatically guided through the series of panels shown in FIGS. 1C through 1F, which results in the definition of a new class. The panels shown obtain the values for the class definition, including name, scope, procedure required to gather input data, parameters to that procedure, and the valid input values. Upon completion of these panels, the user is returned to the main editor panel (FIG. 1G), with a new class shown in the class list.

When the user presses key F4 in the panel shown in FIG. 1B, the display shown in FIG. 1C is generated. FIG. 1C shows in box 11C-1A an indication of what this panel does. Box 11C-1B is an entry panel where the system displays the word "Class Name:" and the operator enters the words "Car Stalled". Block 11C-1C allows the operator to use the cursor 10C to define the scope of the class being defined as either Local, Global or External. Note that the information in Block 11C-2 is identical to the information that is shown in 11B-2. There is no additional information other than that described above in block 11C-1.

FIG. 1D shows what the system does after the operator presses the ENTER key (the ENTER key is not explicitly shown on the drawing). As shown in FIG. 1D, the system asks for Procedure name by displaying box 11D-1A. The operator enters a procedure name. In this example the procedure name is LINEIO. This is the name of a program stored elsewhere and not shown here. This program is the program which will actually acquire the data for the input class being defined.

After the name of the procedure is entered and the operator pushes the ENTER key, the system displays the panel shown in FIG. 1E. Box 11E-1A indicates to the operator the function performed by this panel. The operator enters the parameters in box 11E-1B. In this case the procedure LINEIO expects a character string as a conventional parameter. The character string "Is the car stalled?" is therefore entered in box 11E-1B. The operator then presses the ENTER key resulting in the panel shown in FIG. 1F. Box 11F-1A displays a message telling the operator what function is performed by this panel. In this case the operator must enter in box 11F-1B the class value list which have values of YES and NO. After entering these values and pressing the ENTER key, the panel shown in FIG. 1G is displayed.

The panel in FIG. 1G is similar to the panel shown in FIG. 1B, except that now the class which was defined, namely "Car Stalled" is shown in block 11G-2.

FIGS. 1H shows the result after a second class namely "Gauge On Empty" is also defined. This second class is entered in a similar manner, to the sequence explained above for entering the class "Car Stalled".

FIGS. 1 through 1P illustrate the entry of a logical rule structure (rule tree), using the editor of the present invention. The process begins when the operator presses key F6 followed by key F4, while the panel shown in FIG. 1H is displayed. Nothing changed in block 11I-1 from block 11H-1.

Block 11I-2 now displays three subblocks 11I-2A, 11I-2B and 11-2C. Block 11I-1A tells the operator what information is required by this panel. The operator enters a Node name in block 11I-2b. The operator also uses the cursor 10I to select a Node type for the node being defined. In this case the operator selects a type of GOAL.

Based upon the node type selected, the user will be presented with different input panels. The panels displayed depend on what attributes that particular type of node requires in its definition. In this case, a GOAL node type is selected, and FIGS. 1J and 1K illustrate the entry of the procedure which implements the action required by the goal, and the parameters to that procedure.

It is noted that the panels shown for a definition of a Goal are only illustrative. The point is that for each type of node which is being defined, the system displays an appropriate series of panels that lead the operator to enter the appropriate data.

In the case shown here, when the operator defines a goal node, the first panel displayed is the one shown in FIG. 1J when the system asks in Box 11J-2a for the procedure that is executed if the goal is proven to be true. After the operator enters the name of the procedure, in this case LINEIO, the system goes to the panel shown in FIG. 1K. The panel shown in FIG. 1K asks for the parameters which will be passed to the procedure named in the panel shown in FIG. 1J. In this case the procedure LINEIO expects a character string and the operator enters the string "Add gas to the car".

Upon completion of the node definition, the tree editor screen is displayed. This is shown in FIG. 1L. The defined GOAL node is shown on the left of the screen and the name of the goal is shown on the right. These are actually the top of a tree and as will be seen later as more nodes are defined, panels similar to that shown in FIG. 1L show how the nodes interrelate.

To add additional nodes to the tree, function key F4 (INSERT) is again used, resulting in a panel which request a definition as to how the new node should be entered in the structure. This is shown in FIG. 1M. The system shown in box 11M-1A that the new node can be either a CHILD, a SIBLING, or a NEW LEVEL with reference to the previous node of the tree.

The cursor 10M is used to select the appropriate type of either Child, Sibling or New level; however, the system helps the operator by placing the cursor initially at an allowable type of insertion. The system will not accept types of insertions that would create invalid types of tree structures. In this example the operator selects "child" because he wants the new node to appear "below" the previously defined goal node. After positioning the cursor to select "child", the operator presses the enter key and the display shown in FIG. 1N appears. FIG. 1N illustrate that to select an AND node, the operator appropriately positions the cursor 10N and presses the ENTER key. An AND node has no further attributes, and hence the system returns directly to the tree editor screen after being selected. It is noted that the operator did not have to enter a name in box 11N-2B for a logical AND node. The reason for this is that by definition an AND node can never be at the top of a tree and only nodes at the top of a tree require a name. However, if a name had been entered it would have been acceptable.

After pressing the ENTER key the screen shown in FIG. 1O is displayed. This panel is similar to that shown in FIG. 1L; however, as can be seen easily, the AND node has been added to the tree as a child of the Goal node.

FIG. 1P shows the result of repeating steps similar to those described above in order to enter two evidence nodes. As shown in FIG. 1P, the two evidence nodes appear in a child relationship to the AND node. The left hand section of the screen shows the relationship of the nodes and the right hand section shows some relevant information about each node.

An important feature of the invention is the very clear and easy manner in which the relationship of the nodes is automatically illustrated.

Although not specifically shown herein, the editor can also have other features to guide the user through an edit session. For instance, for certain values the user can be presented with a selection list of valid values if he leaves an input field blank and pressing ENTER. The desired value can then be selected by positioning the cursor and pressing ENTER again.

The screens shown in FIG. 1A to 1P are generated by a computer program. This program can be coded in any of the regularly used languages such as Pascal of "C" and then compiled in a normal manner. The details of the coding are not relevant to the present invention. The present invention deals with the overall flow and structure of the program.

Figure 2:
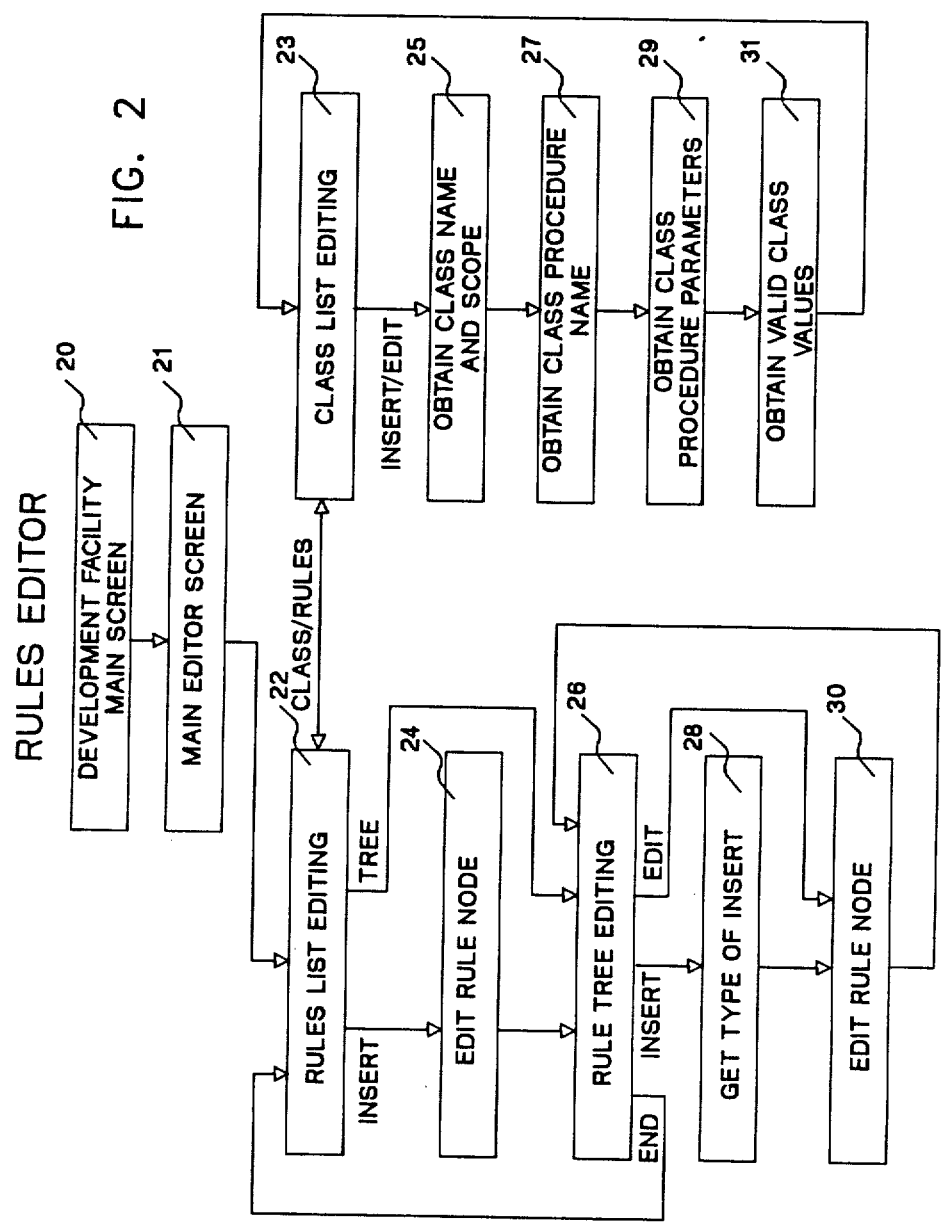
FIG. 2 is a block diagram of the computer program which is used to implement the embodiment of the invention.

FIG. 2 through FIG. 4 show the overall structure and flow of the programs which control the editor function. A computer operating in accordance with the program shown in FIGS. 2 through 4 constitutes a system or machine which is one embodiment of the applicants invention.

An editing session begins when the user selects the editor function from the Development Facility Main Screen as previously described with reference to FIG. 1A. This operation is performed by the program represented by box 20 in FIG. 2. Selection of the editor function causes the Main Editor Screen to be displayed as shown in FIG. 1B. This operation is performed by the program represented by box 20. From this point, the user can toggle between Rules List Editing (screen section 11B-1 in FIG. 1B) and Class List Editing (screen section 11B-2 in FIG. 1B) by using the CLASS/RULES function key. Boxes 22 and 23 and the double arrowed line connecting Boxes 22 and 23 represent how the programs switch between Rules List Editing mode (Box 22) and Class List editing (Box 23).

From Class List Editing (Box 23), the user can either insert a new class node or edit an existing one. In either case, the programs lead the user through the definition of the class node as illustrated in Boxes 25, 27, 29, and 31. This follows the flow of the screens shown in FIGS. 1C through 1F. Box 25 indicates that the user is asked for the name and scope of the class. Box 27 indicates that the user is asked for the name of a procedure which will gather the class input data. Box 29 indicates that the user is asked for parameters required by that procedure. The program represented by Box 31 indicates that the user can enter a list of valid input values for that class. In summary, the panels shown in FIG. 1G and 1H are the result of the operations performed by the series of programs represented by boxes 23, 25, 27, 29 and 31.

As shown by FIG. 1I from Rules List Editing, the user can either create a new rule tree or edit an existing one. The program that performs this operation is represented by box 22. To edit an existing tree, the user presses the TREE function key after positioning the cursor on the tree to be edited, and goes to Rule Tree Editing (Box 26). To create a new rule tree, however, the user presses the INSERT function key and goes to Edit Rule Node (Box 24). These programs would generate the panels shown in FIGS. 1I to 1K. The control flow inside the program represented by box 24 is shown in further detail in FIG. 3.

The Edit Rule Node function (see FIGS. 1I to 1K) begins by displaying a screen which asks the user for the Node Type and Node Name. The program that does this is represented by Box 32. The rule Node Type is obtained from a selection list (see FIG. 1I) to prevent invalid entries. Based on the type selected, the editor configures the editing system and method to request only the attribute information required for that particular type of node.

It should be noted that in the example shown in FIGS. 1A to 1P, for convenience of illustration, only five node types were shown. The program shown in FIG. 3, provides for eleven node types in as much as a practical system would probably require about this many different node types.

The editor changes its operation based upon the node type selected as follows:

If the selected node type is Goal or Hypothesis (Box 33), node attributes of "External Procedure Name" and "Procedure Parameters" are requested (Boxes 34 and 35).

If the selected node type is Evidence (Box 36), node attributes of "Class Name" and "Evidence Value List" are requested (Boxes 37 and 38).

If the selected node type is Reference (Box 39), a node attribute of "Referenced Node's Name" is requested (Box 40).

If the selected node type is Call or Chain (Box 41), a node attribute of "Rules Base Name" is requested (Box 42).

If the selected node type is Any N (Box 43), a node attribute of "Value of N" is requested (Box 44).

As indicated by the N output line on box 43 all other node types (And, Or, Not, Only1) do not require any other attribute information, and will not request it.

Returning to the Rules Editor program flow in FIG. 2, the completion of Edit Rule Node (Box 24) takes the user to Rule Tree Editing Box 26 which is illustrated by the panel shown in FIG. 1L. If this is a new rule tree, the rule node just edited appears as the only node in the tree structure. The user can return to Rules List Editing by pressing the END function key. The user can also edit any existing nodes by positioning the cursor on the desired node and pressing the EDIT function key. The Edit Rule Node function (Box 30) follows the flow already described in FIG. 3. The user can also choose to add new nodes to the tree structure by positioning the cursor on a node and pressing the INSERT key. If this is done, the editor will perform the Get Type of Insert function (Box 28) shown in FIG. 4.

It should be again noted as previously explained that a new node can be inserted into the tree structure in one of three ways. The node can be inserted as a child of the selected node; that is, it will be added under the selected node and the selected node will become its parent. It can be inserted as a sibling of the selected node; that is, it will be added under the selected node's parent, and both nodes will then be children of that parent. The node can also be inserted as a new level; that is, it will be added between the selected node and the selected node's parent.

In FIG. 4, the program represented by Box 45 checks to see if the selected node already has its maximum allowable number of sub-nodes (children). The maximum allowable children for the different node types is as follows:

Goal = 1,
Hypothesis = 1,
Evidence = 0,
Reference = 0,
Call = 0,
Chain = 1,
AnyN = unlimited,
And = unlimited,
Or = unlimited,
Not = 1,
Only1 = unlimited The reason that node types have different maximums is inherent in the definition of the types. For example, logically an AND can have any number of conditions which are AND'ed whereas a NOT can only refer to one condition which is negated.

If the selected node is not at its maximum, the default insert type is set to "Insert Child" (Box 46). If it is at its maximum, then the selected node's parent is checked to see if it already has its maximum allowable number of children (Box 47). If not, the default insert type is set to "Insert Sibling" (Box 48). If it does, the default insert type is set to "Insert New Level"(Box49).

As shown in FIG. 1M, the user is given the opportunity to change this default, but experience has shown that the default is usually the insertion method desired, and providing the default values therefore greatly simplifies the entry of new nodes. This same type of program is used to verify the user's selection, in order to prevent the creation of invalid logic structures.

Once the insertion type is selected (FIG. 2, Box 28), the Edit Rule Node function (Box 30) is again performed as shown in FIG. 3. Upon completion of Edit Rule Node, the tree structure with the new rule node is displayed by returning to Rule Tree Editing (Box 26). This is shown in FIG. 1P.

From this description of the preferred embodiment of the invention, those skilled in the art will recognize a wide variety of applications for the method and variations appropriate to particular applications and to the operation in data processing systems of various designs.

What is claimed is:

1. A context sensitive editor for generating expert systems by an operator comprising:
 a plurality of screens, each of said screens having different categories of information entered therein,
 a first controlling means presenting a first series of said screens, said first series of said screens having a definition of a class of information entered therein, said first controlling means providing a proper sequence of said screens to completely define, for said expert system, said class of information,
 said definition of said class of information including a name, a scope, a designation of a procedure required to obtain said class of information, parameters required by said procedure, and allowable values for said class of information, said scope being local, global, or external,
 a second controlling means presenting a second series of screens, said second series of screens having logical nodes and a logical rule structure defining an interrelationship between said logical nodes in a set of said logical nodes entered therein, said logical nodes having individual types, said types having individual sets of attributes, said individual sets of attributes comprised of different combinations of individual attributes, said individual combination of attributes determined by a combination of parameters including said type of logical node and said logical rule structure.

said second controlling means providing a proper sequence of said screens to completely define said interrelationship between said logical nodes in said set of said logical nodes, a tree structure screen displaying the graphical interrelation of the logical nodes, and a presentation means for presenting said tree structure screen following said definition of said interrelationship between said logical nodes.

2. A context sensitive editor as in claim 1 wherein:

said first and second controlling means operate independently from said operator, said first and second controlling means leading said operator through said definition of said logical rule structure and said definition of said class of information, and said first and second controlling means preventing erroneous input of information by said operator.

3. A method of editing data to generate expert system by an operator comprising the steps of:

presenting a plurality of screens, each of said screens having different categories of information entered therein, controlling said presentation of a first series of said screens, said first series of said screens having a definition of a class of information entered therein, said control of said first series providing a proper sequence of said screens to completely define, for said expert system, said class of information, said definition of said class of information including a name, a scope, a designation of a procedure required to obtain said class of information, parameters required by said procedure, and allowable values for said class of information, said scope being local, global, or external, controlling said presentation of a second series of screens, said second series of screens having logical nodes and a logical rule structure defining an interrelationship between said logical nodes in a set of said logical nodes entered therein, said logical nodes having individual types, said types having individual sets of attributes, said individual sets of attributes comprised of different combinations of individual attributes, said individual combination of attributes determined by a combination of parameters including said type of logical node and said logical rule structure.

said control of said second series of screens providing a proper sequence of said screens to completely define said interrelationship between said logical nodes in said set of said logical nodes, presenting a tree structure screen displaying the graphical interrelation of the logical nodes, and presenting said tree structure screen following said definition of said interrelationship between said logical nodes.

4. A method of editing data as in claim 3 wherein:

said control of said first and second series of screens operating independently from said operator, said control of said first and second series of screens leading said operator through said definition of said logical rule structure and said definition of said class of information, and said control of said first and second series of screens preventing erroneous input of information by said operator.

* * * * *